United States Patent [19]
Follett

[11] 3,922,358
[45] Nov. 25, 1975

[54] TREATMENT OF RAW MEAT

[75] Inventor: Michael John Follett, Fleet, England

[73] Assignee: J. Sainsbury Limited, London, England

[22] Filed: Sept. 18, 1973

[21] Appl. No.: 398,320

[30] Foreign Application Priority Data
Oct. 5, 1972 United Kingdom............... 45987/72

[52] U.S. Cl. ................. 426/316; 426/410; 426/418
[51] Int. Cl.² ........................................... A23B 4/00
[58] Field of Search ............ 426/316, 264, 411, 410

[56] References Cited
UNITED STATES PATENTS

| | | | |
|---|---|---|---|
| 2,711,373 | 6/1955 | Coleman........................ | 426/264 X |
| 2,947,638 | 8/1960 | Snyder et al.................... | 426/264 X |
| 3,122,748 | 2/1964 | Beebe, Jr. ....................... | 426/316 X |
| 3,442,660 | 5/1969 | Shaub............................. | 426/316 X |
| 3,600,200 | 8/1971 | Bernholdt et al................. | 426/264 |

Primary Examiner—Raymond N. Jones
Attorney, Agent, or Firm—Karl W. Flocks

[57] ABSTRACT

A process for treating unfrozen raw meat preferably butchered into smaller cuts, comprising wrapping each cut or several cuts in inners of material permeable to oxygen containing gas, enclosing the wrapped cuts in outers of material permeable to oxygen containing gas, and submitting the packages to heat treatment under pressure at a temperature between the freezing point of the meat and the temperature at which the meat is adversely affected by increased temperature.

9 Claims, No Drawings

TREATMENT OF RAW MEAT

BACKGROUND OF THE INVENTION

1. Field of the Invention

This invention relates to a process for the treatment of meat to enhance or prolong the bloom or bright red pigmentation of raw meat when exposed to oxygen containing gases e.g., air.

2. Description of the prior art

The blood red pigmentation of raw meats such as beef or lamb is due primarily to the presence of myoglobin pigments in these meats. Unfrozen raw meat when stored for a substantial period of time, i.e., one, or more usually 2 to 3 days, loses its bright red appearance at the surface due to the loss of oxygen from the myoglobin pigment and although the meat is still safely edible the absence of this bright red appearance leads to it being less appealing to the purchaser.

SUMMARY

The main object of the present invention is to provide a process by which the bright red appearance at the surface of the unfrozen raw meat is enhanced and retained for a longer period during which the meat will not undergo deterioration and be rendered unfit for consumption.

According to the present invention a process for treating unfrozen raw meat comprises subjecting freshly cut pieces of meat, wrapped in a container permeable to oxygen, to an oxygen containing gas mixture under pressure at a temperature between the freezing point of the meat and the temperature at which the meat is adversely affected by increased temperature.

DESCRIPTION OF PREFERRED EMBODIMENTS

The meat is preferably treated by the process of the invention by exposing the meat to gas mixture containing $O_2$ under pressure above normal atmospheric pressure. Preferably the meat is subjected to an increasing pressure to bring the meat to a uniform pressure throughout and then maintained under such pressure for 2 to 24 hours, depending upon the nature of the meat, and the period for which it is to retain its colour. For example with dark cutting beef which has a purplish colour a pressurising period of 2 hours is adequate if carried out in a shop and the beef will be sold in say three hours but if the beef is prepacked for sale some time later, the pressure must be maintained for longer periods such as eight hours or a longer period.

In one preferred process for treating unfrozen raw meat to enhance or prolong its bright red pigmentation, the meat is first butchered into smaller cuts, these cuts are held in containers known as inners which are then wrapped in wrapping material, e.g., the film form which is permeable to oxygen, packed into boxes or other containers permeable to oxygen gas and placed in a cooled pressurising vessel.

The wrapping material may be any conventional film of plastic origin with the necessary permeability to oxygen gas. A suitable material may be one of polyethylene or polythene-ethylene vinyl acetate copolymer. The individual cuts of meat or number of cuts in inners are packed in the wrapping material and these packages are placed in containers such as cartons or boxes known as outers which are themselves permeable to oxygen gas.

The invention will now be further described with reference to the following Example.

EXAMPLE

The loaded outers are placed in a pressurisable vessel. A suitable vessel is a circular container of cast iron measuring 7 feet 6 inches in diameter, 14 feet long with a wall thickness of three eighths of an inch. However, any vessel capable of withstanding a working pressure of up to 150 lbs. per square inch above normal atmospheric pressure can be used, providing the material from which it is constructed is inert and impermeable to oxygen gas.

The loaded outers having been packed into the vessel within for example, four hours of preparation, the vessel is sealed and maintained at a temperature above 28.4°F. (at which meat freezes) and below a temperature at which the meat is adversely effected in the form of partial cooking. A gas mixture containing oxygen gas, e.g., air, is supplied in the example to the vessel under a pressure above that in the outers until a stable pressure of up to 150 lbs. per square inch is reached, usually in less than one hour. The vessel is thereafter maintained under the said interior conditions for a period of 2 to 24 hours to complete the enhancement of the bright red appearance at the surface of the meat. The laoded vessel can be maintained under the aforesaid conditions for a longer period e.g., 3 to 4 days during which the meat will not be subjected to deteriorative change e.g., excessive bacteriological change or colour variation, and thus rendered unfit for human consumption.

The vessel is fitted with a depressurising valve such as a self compensating valve which permits controlled linear decompression. This prevents in the meat the phenomenon known as bends in human beings subjected to rapid decompression which causes the meat cuts to froth at the surfaces.

In the example given above a pressure of 150 lbs. per square inch has been given but it will be understood that while higher pressures will increase the speed of the process, with higher pressures the risk of the bends phenomenon occurring on decompression is greater and 150 lbs. per square inch has been found by experience to be the most suitable upper pressure limit. Since higher pressure will increase the speed of the process, it will be understood that a shorter time at a high pressure (e.g., 150 psi) will give desired results as will lower pressure for a longer time (e.g., 24 hours); and that the time-pressure combination should be selected so that the meat will retain its bloom for 2–3 days or more.

The meat, after the controlled decrease in pressure to normal atmospheric pressure, can be removed from the pressure vessel and stored in cooled or refrigerated conditions above the freezing point of the meat for several additional, e.g., 2 to 3 days, without losing a substantial proportion of its bloom or bright red appearance at the surface.

I claim:

1. A process for treating unfrozen raw meat cuts comprising
   subjecting freshly cut meat, wrapped in a container permeable to oxygen gas, to a gas mixture containing $O_2$ gas under pressure greater than atmospheric pressure for 2 to 24 hours at a temperature between the freezing point of the meat and the temperature at which the meat is adversely affected by increased temperature, the time-pressure combination being sufficient for the meat to retain its bright red color for at least 2 days, and maintaining the so-oxygenated unfrozen raw meat cuts at a temperature above freezing.

2. A process according to claim 1 wherein the meat is first subjected to increasing pressure to bring it to uniform pressure throughout before being maintained under said pressure for said 2 to 24 hours.

3. A process according to claim 1, wherein the pressurising period is about three hours.

4. A process according to claim 1 wherein the unfrozen raw meat is butchered into smaller cuts, the cuts are wrapped in inners, then in the inners the cuts are wrapped in wrapping material permeable to oxygen, packed into containers permeable to oxygen and stored in a cool condition.

5. A process according to claim 4 wherein the wrapping material is selected from the Group consisting of polyethylene and polytheneethylene vinyl acetate polymer.

6. A process according to claim 5 wherein at least one of said individual meat cuts is packed in the wrapping material and thereafter disposed in at least one outer in the form of a carton which is permeable to a gas at least containing some oxygen gas and each loaded outer is disposed in a vessel under pressure and of material inert and impermeable to said gas.

7. A process according to claim 1 wherein the final pressure is not in excess of 150 lbs. per square inch.

8. A process in accordance with claim 1, wherein said pressurising period is 3–8 hours.

9. A process in accordance with claim 8, wherein the final pressure is about 150 lbs./sq.in. and wherein said gas mixture containing $O_2$ gas is air.

* * * * *